United States Patent
Evans

(10) Patent No.: US 10,530,741 B2
(45) Date of Patent: *Jan. 7, 2020

(54) CONFIGURATION SERVICES

(71) Applicant: METASWITCH NETWORKS LTD, Enfield (GB)

(72) Inventor: Michael Jeffrey Evans, Enfield (GB)

(73) Assignee: Metaswitch Networks Ltd, Enfield (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/017,304

(22) Filed: Jun. 25, 2018

(65) Prior Publication Data

US 2019/0068545 A1    Feb. 28, 2019

Related U.S. Application Data

(63) Continuation of application No. 15/052,328, filed on Feb. 24, 2016, now Pat. No. 10,038,666.

(30) Foreign Application Priority Data

Feb. 25, 2015 (GB) .................... 1503168.5

(51) Int. Cl.
*H04L 29/06* (2006.01)
*H04L 29/12* (2006.01)
*H04L 29/08* (2006.01)

(52) U.S. Cl.
CPC .......... *H04L 61/1511* (2013.01); *H04L 67/10* (2013.01)

(58) Field of Classification Search
CPC ................................. H04L 61/1511
USPC ........................................ 709/220
See application file for complete search history.

(56) References Cited

U.S. PATENT DOCUMENTS

| 6,895,431 | B1 | 5/2005 | Bero |
| 9,634,965 | B2 | 4/2017 | Mehta |
| 2012/0131162 | A1 | 5/2012 | Brandt et al. |
| 2014/0136675 | A1 | 5/2014 | Yao et al. |
| 2016/0301762 | A1 | 10/2016 | Strijkers |

FOREIGN PATENT DOCUMENTS

EP          1039685 A2    9/2000

OTHER PUBLICATIONS

Getting Started With Cloud Sites—Managing DNS Records. Rackspace Support, www.rackspace.com, last updated Dec. 28, 2015, 5 pages.

(Continued)

*Primary Examiner* — Adnan M Mirza
(74) *Attorney, Agent, or Firm* — EIP US LLP

(57) ABSTRACT

Measures, including methods, systems and non-transitory computer-readable storage mediums, for providing a Domain Name Service (DNS) configuration service for one or more network services provided in a cloud environment. Update data relating to one or more relationship updates that have occurred in at least one of the one or more network services is received. The one or more relationship updates relate to one or more service provision units in a cluster of service provision units deployed in the cloud environment to provide the at least one network service. DNS policy configuration data associated with the at least one network service is identified. On the basis of the identified DNS policy configuration data, data in a DNS configuration data database is updated.

16 Claims, 2 Drawing Sheets

(56) References Cited

OTHER PUBLICATIONS

Creating DNS records with Cloud DNS. Rackspace Support, https://support.rackspace.com/how-to/creating-dns-records-with-cloud-dns/, last updated Nov. 11, 2014, 4 pages.
Create DNS Records for cloud servers with the Control Panel. Rackspace Support, www.rackspace.com, last updated Jan. 20, 2016, 4 pages.
What is cloud orchestration, Cloud Orchestration FAQ, https://support.rackspace.com/how-to/cloud-orchestration-faq/, accessed on Feb. 19, 2016.
Cloud Orchestration: Automating Deployments of Full Stack Configurations. The Official Rackspace Blog, www.rackspace.com, last updated Mar. 12, 2014, 7 pages.
Dynamic updates in the Domain Name Systems (DNS Update). Network Working Group, F. Vixie, editor. Apr. 1997, 26, pages.
UKIPO Search Report dated Aug. 13, 2015 for Application No. GB1503168.5, filed Feb. 24, 2016.

CONFIGURATION SERVICES

CROSS-REFERENCE TO RELATED APPLICATIONS

This application is a continuation 35 U.S.C. § 120 of U.S. application Ser. No. 15/052,328, filed Feb. 24, 2016, which claims priority under 35 U.S.C. § 119(a) to United Kingdom patent application No. GB 1503168.5, filed on Feb. 25, 2015, the entire content of which is hereby incorporated by reference.

BACKGROUND OF THE INVENTION

Field of the Invention

The present disclosure relates to configuration services. In particular, but not exclusively, the present disclosure relates to provision of a Domain Name Service (DNS) configuration service for one or more network services provided in a cloud environment.

Description of the Related Technology

Horizontally scalable network services and applications often use DNS load balancing as a way of distributing incoming requests across the cluster of servers or virtual machines (VMs) providing the service. One of the attractions of deploying such services in a cloud environment is the ability to quickly scale the service up and down by adding or removing VMs to the cluster, but this also requires DNS records to be updated so the new VMs take their share of the load.

There are no standard application programming interfaces (APIs) for updating DNS records, so in general, services do not update DNS records themselves; either the updates can be done manually or the orchestration tools used to manage the services can be programmed to update DNS entries as VMs are added or removed from the cluster.

Some orchestration toolsets have support for DNS configuration in various environments, but this usually requires scripts to be written in a programming or scripting language. Usually these scripts are environment specific as they depend on the specific DNS APIs provided by the cloud environment.

Some orchestration toolsets, provide a relationship model for allowing different network services to locate each other and form connections, with component specific hooks that are invoked as new nodes are added to each service tier. As an example, consider an application comprising a front end tier of web servers and a back-end database which may be a clustered system.

In some known systems, the web servers are modelled as one network service and the database servers are modelled as another network service, and the administrator can grow or shrink the number of servers/virtual machines in each network service by adding or removing "service provision units".

The orchestrator defines a relationship between the two network services, and each network service implements a number of hooks associated with that relationship. For example, if the relationship was called "database", each service would implement hooks called "database-relation-joined", "database-relation-departed", "database-relation-changed" and "database-relation-broken".

When the network services are first launched and the relationship established, the orchestrator may invoke the "database-relation-joined" hook on each service provision unit of each service for each service provision unit of the other service. So, if the web server tier initially had two service provision units and the database tier one, the hook on each of the web server service provision units would get invoked once, but the hook on the database service provision unit would get invoked twice, once for each web server service provision unit.

As service provision units are added and removed from each service, the "database-relation-joined" and "database-relation-departed" hooks are invoked, so that the service provision units in each service have an up-to-date picture of all the servers in the other service.

The service provision units can also exchange configuration data over the relation, such as Internet Protocol (IP) addresses and port numbers, using a "set-relation" method to advertise the data and a "get-relation" method to read the data. If one service provision unit does a "set-relation" call, all the service provision units in the other service get told of the change via their "database-relation-changed" hook.

Known orchestrators do not have any inbuilt support for updating DNS entries.

SUMMARY

According to first embodiments, there is a method of providing a Domain Name Service (DNS) configuration service for one or more network services provided in a cloud environment, the method comprising:

receiving update data relating to one or more relationship updates that have occurred in at least one of the one or more network services, wherein the one or more relationship updates relate to one or more service provision units in a cluster of service provision units deployed in the cloud environment to provide the at least one network service;

identifying DNS policy configuration data associated with the at least one network service; and on the basis of the identified DNS policy configuration data, updating data in a DNS configuration data database.

According to second embodiments, there is a system for use in providing a Domain Name Service (DNS) configuration service for one or more network services provided in a cloud environment, the system comprising at least one memory including computer program code; and at least one processor in data communication with the at least one memory, wherein the at least one processor is configured to:

receive update data relating to one or more relationship updates that have occurred in at least one of the one or more network services, wherein the one or more relationship updates relate to one or more service provision units in a cluster of service provision units deployed in the cloud environment to provide the at least one network service;

identify DNS policy configuration data associated with the at least one network service; and on the basis of the identified DNS policy configuration data, update data in a DNS configuration data database According to third embodiments, there is a non-transitory computer-readable storage medium comprising computer-executable instructions which, when executed by a processor, cause a computing device to perform a method for providing a Domain Name Service (DNS) configuration service for one or more network services provided in a cloud environment, the method comprising:

receiving update data relating to one or more relationship updates that have occurred in at least one of the one or more network services, wherein the one or more relationship updates relate to one or more service provision units in a cluster of service provision units deployed in the cloud environment to provide the at least one network service;

identifying DNS policy configuration data associated with the at least one network service; and on the basis of the identified DNS policy configuration data, updating data in a DNS configuration data database.

Further features of embodiments will become apparent from the following description, given by way of example only, which is made with reference to the accompanying drawings.

DETAILED DESCRIPTION OF CERTAIN INVENTIVE EMBODIMENTS

Figure 1:
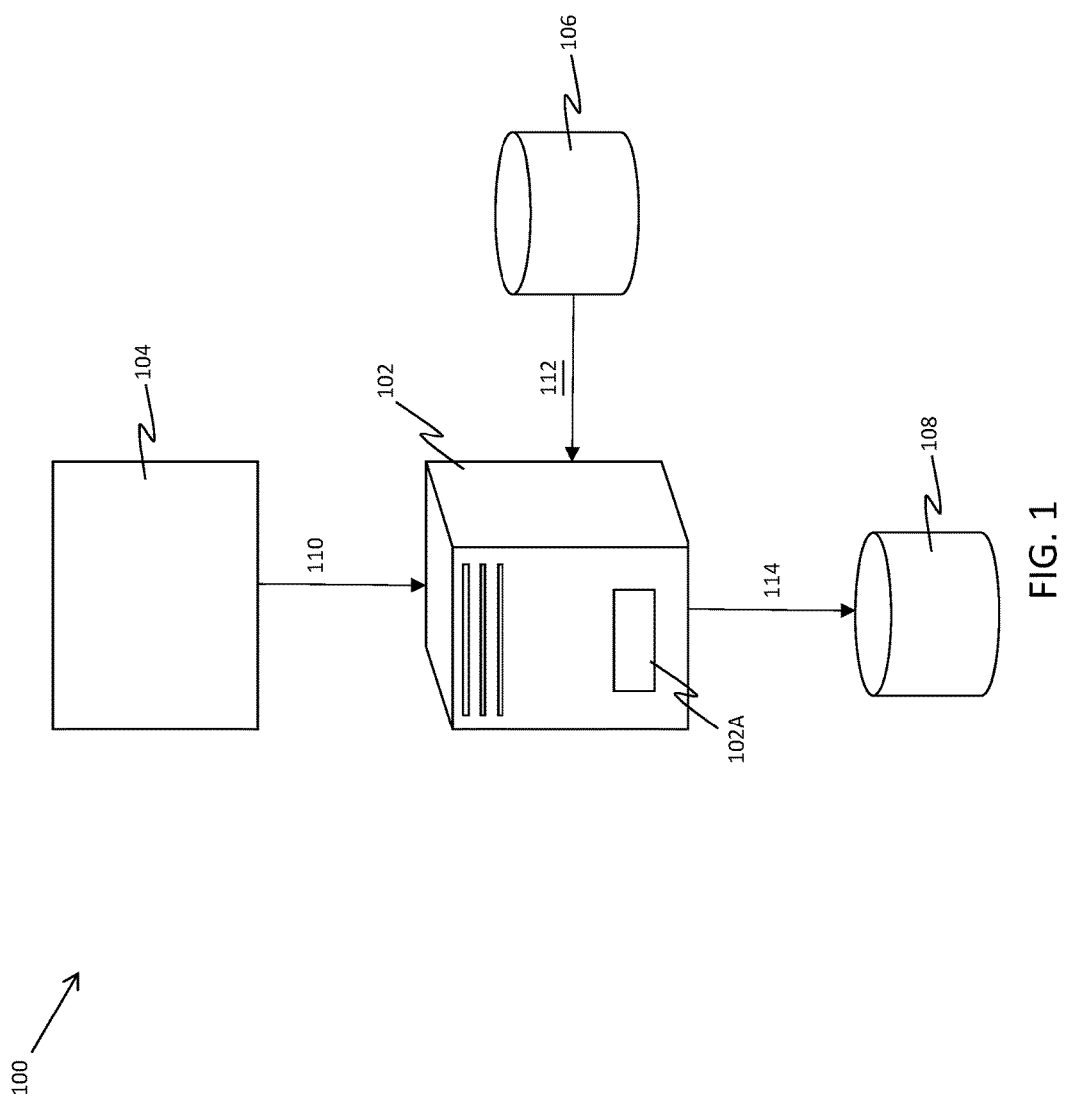
FIG. 1 shows a system diagram according to embodiments.

FIG. 1 shows a system diagram of a network 100 according to embodiments. Network 100 comprises a DNS configuration service 102, a DNS configuration data database 108, a DNS policy configuration data database 106 and a relationship update source 104.

DNS configuration service 102 comprises a processor and/or memory 102A (or processing system) for providing data processing tasks of embodiments. In embodiments, DNS configuration service 102 comprises a network node (or nodes), for example in the form of a server or other such network entity.

DNS configuration data database 108 comprises a database for storing DNS configuration data and is accessible in the network by DNS configuration service node 102 for DNS configuration data updates and also by other nodes (not shown) in the network for DNS lookup queries in relation to network services provided in network 100.

DNS policy configuration data database 106 comprises a database for storing DNS policy configuration data for network services provided in network 100.

Relationship update source 104 comprises one or more sources which provide DNS configuration service node 102 with update data relating to one or more relationship updates that have occurred in network services provided in network 100. In some embodiments, relationship update source 104 comprises one or more service provision units and in other embodiments comprises a cloud orchestration application. A service provision unit could for example be deployed as one or more servers and/or one or more virtual machines.

Embodiments comprise measures, including methods, apparatus and computer programs, for providing a Domain Name Service (DNS) configuration service for one or more network services provided in a cloud environment in network 100. Update data relating to one or more relationship updates that have occurred in at least one of the one or more network services is received 110 by DNS configuration service node 102. The one or more relationship updates relate to one or more service provision units in a cluster of service provision units deployed in the cloud environment to provide the at least one network service. DNS configuration service 102 identifies 112 DNS policy configuration data associated with the at least one network service and, on the basis of the identified DNS policy configuration data, updates 114 data in DNS configuration data database 108.

In embodiments, the updating (of data in DNS configuration data database 108) comprises adding, to DNS configuration data database 108, one or more DNS resource records associated with the at least one network service.

In embodiments, the receiving (of update data relating to one or more relationship updates) comprises receiving the update data from a cloud orchestration application 104 responsible for maintaining a relationship model of the one or more network services provided in the cloud environment. In some embodiments, a relationship between the one or more network services and the DNS configuration service is configured in the cloud orchestration application; in such embodiments, the update data is received in response to the configuration of the cloud orchestration application.

In embodiments, the receiving (of update data relating to one or more relationship updates) comprises receiving the update data from a service provision unit 104 in the cluster of service provision units deployed in the cloud environment to provide the at least one network service. In some such embodiments, the update data is received from a new service provision unit joining the cluster of service provision units.

In some embodiments, the one or more relationship updates are associated with one or more new service provision units joining a cluster of service provision units deployed in the cloud environment to provide the at least one network service, whereas in other embodiments, the one or more relationship updates are associated with one or more service provision units being removed from a cluster of service provision units deployed in the cloud environment to provide the at least one network service. In other embodiments, the one or more relationship updates are associated with one or more existing service provision units in a cluster of service provision units deployed in the cloud environment to provide the at least one network service.

In embodiments, the identifying (of DNS policy configuration data) comprises DNS configuration service 102 retrieving the DNS policy configuration data from DNS policy configuration data database 106 responsible for storing configuration data for a plurality of network services provided in the cloud environment. In other embodiments, DNS configuration service 102 holds a local cache of DNS policy configuration data so has the configuration data to hand without the need to access DNS policy configuration data database 106.

The at least one network service may for example comprise one or more of a Session Initiation Protocol (SIP) router service, an edge proxy service, a cloud environment provisioning service, a communication session charging service, a service provision unit registration service, and a subscriber configuration data caching service.

Embodiments leverage the relationship model provided by orchestration environments such as Juju™ (or other orchestration environments that provide similar capabilities) to allow DNS entries to be automatically updated for a network service according to a configured policy. Embodiments comprise a DNS configuration service 102 which exposes a generic DNS relationship to other network services in the orchestration environment and is configured with a policy defining which DNS records are used for each network service.

In embodiments, DNS configuration service 102 uses the hooks provided by an orchestration environment to maintain a picture of the number of nodes in each of the related network services, and makes changes to the DNS configuration as nodes are added and removed from these network services, as specified by the policy.

An example of a DNS policy configuration according to embodiments could be as follows:

| Service | DNS | | | |
|---|---|---|---|---|
| SIP router service | siprouter-<unit>.example.com | A | 300 | public |
| | siprouter.example.com | A | 300 | private |
| edge proxy service | edgeproxy-<unit>.example.com | A | 300 | public |
| | edgeproxy.example.com | A | 300 | public |

With the above example policy, for each unit in the Session Initiation Protocol (SIP) router service, the DNS configuration service can maintain a DNS A record with the name siprouter-<unit>.example.com with a time to live (TTL) of 300 seconds using the public IP address, and a DNS A record with the name siprouter.example.com with a TTL of 300 seconds using the private IP address.

With the above example policy, for each unit in the edge proxy service, the DNS configuration service can maintain a DNS A record with the name edgeproxy-<unit>.example.com with a TTL of 300 seconds using the public IP address, and a DNS A record with the name edgeproxy.example.com with a TTL of 300 seconds using the public IP address.

Figure 2:
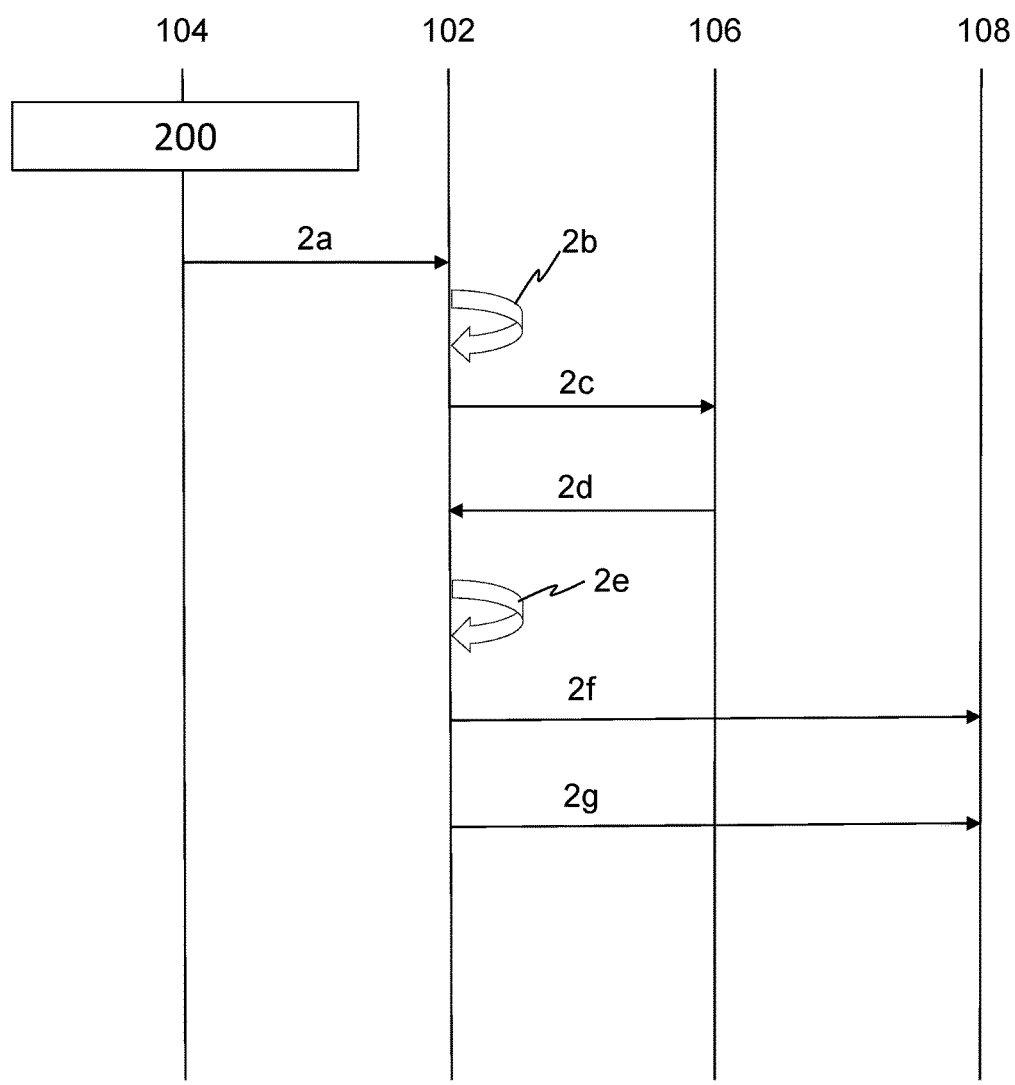
FIG. 2 shows a flow diagram according to embodiments.

FIG. 2 shows a flow diagram according to embodiments. The flow diagram of FIG. 2 shows the process of a new service provision unit joining the SIP router service with the example DNS policy configuration given above.

In item 200, a new service provision unit joins the SIP router service.

In step 2a, relationship update source 104 provides update data relating to one or more relationship updates that have occurred in the SIP router service. The relationship update source 104 could for example comprise the new service provision unit itself or could comprise an orchestration environment which maintains a relationship model of the SIP router service. Step 2a may for example comprise a notification in the form of Relation-join siprouter 1 public=1.2.3.4 private=10.1.2.3, where 1.2.3.4 and 10.1.2.3 are the public and private IP addresses of the new service provision unit respectively.

In step 2b, DNS configuration service 102 identifies DNS policy configuration data associated with the SIP router service. In these embodiments, the identification comprises DNS configuration service 102 retrieving DNS policy configuration data for the SIP router service from DNS policy configuration data database 106 in steps 2c and 2d. Step 2c may for example comprise a read request in the form of Read policy siprouter. Step 2d may for example comprise DNS policy configuration data in the form of Policy siprouter= . . . .

In some embodiments, the policy configuration data is stored in a file and the process of DNS configuration service 102 identifying DNS policy configuration data comprises DNS configuration service 102 reading the file and finding the appropriate network service policies. In other embodiments, the process of DNS configuration service 102 identifying DNS policy configuration data comprises DNS configuration service 102 reading a 'flat file' (containing DNS policy configuration data) at the start of each day (or other periodic interval) and/or when prompted externally and holding the DNS policy configuration data internally in memory.

In step 2e, DNS configuration service 102 identifies DNS policy configuration data associated with the SIP router service from the data received in step 2d, and updates data in DNS configuration data database 108 on the basis of the identified DNS policy configuration data. In the embodiments depicted in FIG. 2, the updating of data in DNS configuration data database 108 comprises DNS configuration service 102 transmitting a first DNS configuration data update command to DNS configuration data database 108 in step 2f and also a second DNS configuration data update command to DNS configuration data database 108 in step 2g. Step 2f may for example comprise an add data command in the form of Add DNS "siprouter-2.example.com A 300 1.2.3.4". Step 2g may for example comprise an add data command in the form of Add DNS "siprouter.example.com A 300 10.1.2.3". In other embodiments, steps 2f and 2g may be combined into a single DNS configuration data update command.

More complex DNS policies are possible. For example:

In embodiments, if DNS service record (SRV) records are used for load balancing, the policy could be set up to make the weight in the DNS record depend on the size of virtual machine each unit is deployed on, and/or the priority could be set to different values depending on the rack or site location of the VM. In embodiments, the identified DNS policy configuration data defines a weight in one or more DNS resource records which is dependent upon the size of a virtual machine which a service provision unit is deployed as to provide the at least one network service. In embodiments, the identified DNS policy configuration data defines a priority which is dependent upon a rack or site location of a service provision unit deployed to provide the at least one network service.

In embodiments, the policy includes split horizon configuration, where different DNS records are configured in different DNS "views" where the different views are used depending on the location of the user requesting access to the service. In embodiments, the identified DNS policy configuration data comprises split horizon configuration data defining one or DNS views which depend on the location of a user requesting access to the at least one network service.

In embodiments, the policy depends on a state value exported by the service units across the relationship interface. For example, the policy could defer adding DNS configuration for some service interfaces until the service advertises that it is ready, or the DNS configuration could be updated if the service is placed into a quiescent state. In embodiments, the identified DNS policy configuration data comprises at least one state value generated by one or more service provision units deployed to provide the at least one network service. For example, the at least one state value could be associated with deferring the updating of the data in the DNS configuration data database until the at least one network service is at a predetermined operational state, or the at least one state value could be associated with updating of the data in the DNS configuration data database dependent upon the at least one network service being placed in a quiescent state.

Embodiments allow for multiple implementations of the DNS configuration service, depending on which DNS server is being used. For example, in an Amazon™ Web Services (AWS) cloud using the Route53 DNS service, the DNS configuration service uses the Route53 APIs to add and remove DNS entries. For clouds that do not have their own DNS service, the DNS configuration service may include its own integrated DNS server and use relation hooks from an orchestration environment such as Juju™ to update the zone configuration files for this server directly. If a service provider wants to use a different DNS server such as PowerDNS, the DNS configuration service could use the PowerDNS APIs.

Embodiments decouple the network services themselves and the DNS policy from the specifics of the underlying DNS technology used in any particular environment.

Embodiments facilitate configuration of different DNS policies depending on the requirements of the deployment and the DNS support of the protocols in use, without requiring changes to the network service. For example, a SIP service could be deployed in a single site on homogenous VMs using DNS A record load balancing. The same SIP service could be deployed on VMs with different capabilities using a suitable weighted SRV policy to weight the distribution of requests. The same service could be deployed in a complex geo-redundant multi-site configuration using a suitable split horizon DNS policy so that requests are served from a nearby site if possible, but can be redirected to a more remote site in failure scenarios.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of providing a Domain Name Service (DNS) configuration service for one or more network services provided in a cloud environment, the method comprising:
    receiving update data relating to one or more relationship updates that have occurred in at least one of the one or more network services provided in the cloud environment,
        wherein a cluster of service provision units deployed in the cloud environment provide the at least one network service, and
        wherein the receiving comprises receiving the update data from a service provision unit in the cluster of service provision units deployed in the cloud environment to provide the at least one network service,
        wherein the one or more relationship updates are associated with at least one of:
            one or more service provision units joining the cluster of service provision units deployed in the cloud environment to provide the at least one network service,
            one or more service provision units being removed from the cluster of service provision units deployed in the cloud environment to provide the at least one network service, and
        one or more of the existing service provision units in the cluster of service provision units deployed in the cloud environment to provide the at least one network service;
    identifying DNS policy configuration data associated with the at least one network service provided in the cloud environment; and
    on the basis of the identified DNS policy configuration data, updating data in a DNS configuration data database.

2. The method of claim 1, wherein the updating comprises adding, to the DNS configuration data database, one or more DNS resource records associated with the at least one network service.

3. The method of claim 1, wherein the receiving comprises receiving the update data from a cloud orchestration application responsible for maintaining a relationship model of the one or more network services provided in the cloud environment.

4. The method of claim 3, wherein a relationship between the one or more network services and the DNS configuration service is configured in the cloud orchestration application, and
    wherein the update data is received in response to the configuration of the cloud orchestration application.

5. The method of claim 1, wherein the update data is received from a new service provision unit joining the cluster of service provision units.

6. The method of claim 1, wherein the identifying comprises retrieving the DNS policy configuration data from a DNS policy configuration data database responsible for storing configuration data for a plurality of network services provided in the cloud environment.

7. The method of claim 1, wherein the identified DNS policy configuration data defines a weight in one or more DNS resource records which is dependent upon the size of a virtual machine which a service provision unit is deployed on to provide the at least one network service.

8. The method of claim 1, wherein the identified DNS policy configuration data defines a priority which is dependent upon a rack or site location of a service provision unit deployed to provide the at least one network service.

9. The method of claim 1, wherein the identified DNS policy configuration data comprises split horizon configuration data defining one or more DNS views which depend on the location of a user requesting access to the at least one network service.

10. The method of claim 1, wherein the identified DNS policy configuration data comprises at least one state value generated by the one or more service provision units deployed to provide the at least one network service.

11. The method of claim 10, wherein the at least one state value is associated with deferring the updating of the data in the DNS configuration data database until the at least one network service is at a predetermined operational state.

12. The method of claim 10, wherein the at least one state value is associated with updating of the data in the DNS configuration data database dependent upon the at least one network service being placed in a quiescent state.

13. The method of claim 1, wherein a service provision unit is deployed as one or more servers and/or one or more virtual machines.

14. The method of claim 1, wherein the at least one network service comprises one or more of:
    a Session Initiation Protocol (SIP) router service,
    an edge proxy service,
    a cloud environment provisioning service,
    a communication session charging service,
    a service provision unit registration service, and
    a subscriber configuration data caching service.

15. A system for use in providing a Domain Name Service (DNS) configuration service for one or more network services provided in a cloud environment, the system comprising at least one memory including computer program code; and at least one processor in data communication with the at least one memory, wherein the at least one processor is configured to:
    receive update data relating to one or more relationship updates that have occurred in at least one of the one or more network services provided in the cloud environment, wherein a cluster of service provision units deployed in the cloud environment provide the at least one network service, wherein the receiving comprises receiving the update data from a service provision unit in the cluster of service provision units deployed in the cloud environment to provide the at least one network service, and wherein the one or more relationship updates are associated with at least one of:
- one or more service provision units joining the cluster of service provision units deployed in the cloud environment to provide the at least one network service,
- one or more service provision units being removed from the cluster of service provision units deployed in the cloud environment to provide the at least one network service, and
- one or more of the existing service provision units in the cluster of service provision units deployed in the cloud environment to provide the at least one network service;

identify DNS policy configuration data associated with the at least one network service provided in the cloud environment; and on the basis of the identified DNS policy configuration data, update data in a DNS configuration data database.

16. A non-transitory computer-readable storage medium comprising computer-executable instructions which, when executed by a processor, cause a computing device to perform a method of providing a Domain Name Service (DNS) configuration service for one or more network services provided in a cloud environment, the method comprising:

receiving update data relating to one or more relationship updates that have occurred in at least one of the one or more network services provided in the cloud environment, wherein a cluster of service provision units deployed in the cloud environment provide the at least one network service, and wherein the receiving comprises receiving the update data from a service provision unit in the cluster of service provision units deployed in the cloud environment to provide the at least one network service, wherein the one or more relationship updates are associated with at least one of:
- one or more service provision units joining the cluster of service provision units deployed in the cloud environment to provide the at least one network service,
- one or more service provision units being removed from the cluster of service provision units deployed in the cloud environment to provide the at least one network service, and
- one or more of the existing service provision units in the cluster of service provision units deployed in the cloud environment to provide the at least one network service;

identifying DNS policy configuration data associated with the at least one network service provided in the cloud environment; and on the basis of the identified DNS policy configuration data, updating data in a DNS configuration data database.

* * * * *